United States Patent
Johnsson et al.

(10) Patent No.: US 9,980,163 B2
(45) Date of Patent: May 22, 2018

(54) ADMISSION CONTROL FOR ALLOWING OR REJECTING A MEASUREMENT REQUEST BETWEEN A FIRST AND A SECOND DEVICE

(71) Applicant: TELEFONAKTIEBOLAGET L M ERICSSON (PUBL), Stockholm (SE)

(72) Inventors: Andreas Johnsson, Uppsala (SE); Catalin Meirosu, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days. days.

(21) Appl. No.: 14/783,373

(22) PCT Filed: Apr. 11, 2013

(86) PCT No.: PCT/SE2013/050391

§ 371 (c)(1),
(2) Date: Oct. 8, 2015

(87) PCT Pub. No.: WO2014/168530
PCT Pub. Date: Oct. 16, 2014

(65) Prior Publication Data
US 2016/0073279 A1 Mar. 10, 2016

(51) Int. Cl.
*H04L 12/26* (2006.01)
*H04W 24/08* (2009.01)
(Continued)

(52) U.S. Cl.
CPC ......... *H04W 24/08* (2013.01); *H04L 43/0882* (2013.01); *H04L 43/103* (2013.01);
(Continued)

(58) Field of Classification Search
CPC ............... H04W 24/08; H04W 72/085; H04L 43/0882; H04L 43/103; H04L 43/50; H04L 41/12
See application file for complete search history.

(56) References Cited

U.S. PATENT DOCUMENTS

| 2004/0098479 A1* | 5/2004 | Bennett ............... H04L 43/0852 709/224 |
| 2008/0259809 A1* | 10/2008 | Stephan ............... H04L 41/142 370/252 |

(Continued)

FOREIGN PATENT DOCUMENTS

CN 1260656 A 7/2000
WO 2007110329 A1 10/2007
(Continued)

OTHER PUBLICATIONS

Hedayat, et al., A Two-Way Active Measurement Protocol (TWAMP), RFC 5357, Oct. 2008.
(Continued)

*Primary Examiner* — Abdelnabi O Musa

(57) ABSTRACT

An Admission Control Node and a method performed thereby for enabling a measurement between a first and a second device in a communication network, and a first device and a method performed thereby for performing the measurement between the first device and the second device in a communication network are provided. The method in the Admission Control Node comprises receiving, from the first device, a request for performing the measurement between the first and the second device and, determining segments comprised in a path between the first and the second device. The method also comprises determining a current measurement situation for the segments, and deciding to allow or reject the request for performing the measurement based on the current measurement situation for the segments. The method further comprises informing the first device about the decision of allowing or rejecting the request for performing the measurement.

25 Claims, 11 Drawing Sheets

(51) Int. Cl.
*H04W 72/08* (2009.01)
*H04L 12/24* (2006.01)

(52) U.S. Cl.
CPC ........... *H04L 43/50* (2013.01); *H04W 72/085* (2013.01); *H04L 41/12* (2013.01)

(56) References Cited

U.S. PATENT DOCUMENTS

| | | | |
|---|---|---|---|
| 2011/0319070 A1* | 12/2011 | Nosley | H04W 36/0094 455/422.1 |
| 2014/0018010 A1* | 1/2014 | Gao | H04W 72/085 455/67.13 |
| 2015/0139015 A1* | 5/2015 | Kadous | H04W 24/08 370/252 |
| 2016/0157122 A1* | 6/2016 | Zhang | H04W 24/10 370/328 |

FOREIGN PATENT DOCUMENTS

| | | |
|---|---|---|
| WO | 2012002853 A1 | 1/2012 |
| WO | 2012129806 A1 | 10/2012 |

OTHER PUBLICATIONS

Cisco IOS IP SLAs Overview, May 2, 2005.
Postel, Internet Control Message Protocol, RFC 792, Sep. 1981.
ITU-T G.8013/Y.1731, Series G: Transmission Systems and Media, Digital Systems and Networks, Packet over Transport aspects—Ethernet over Transport aspects, Series Y: Global Information Infrastructure, Internet Protocol Aspects and Next-Generation Networks, OAM functions and mechanisms for Ethernet based networks, Jul. 2011.
Baillargeon, et al., Ericsson Two-Way Active Measurement Protocol (TWAMP) Value-Added Octets, RFC 6802, Nov. 2012.
ITU-T Y.1540, Series Y: Global Information Infrastructure, Internet Protocol Aspects and Next-Generation Networks, Internet protocol aspects—Quality of service and network performance, Internet protocol data communication service—IP packet transfer and availability performance parameters, Mar. 2011.
Samknows Test Methodology, Methodology and technical information relating to the SamKnows testing platform, Document Reference: SQ301-002-EN, Apr. 2012.
Definition of RIPE atlas, https://labs.ripe.net, May 24, 2011.
Calyam, et al., Orchestration of Network-Wide Active Measurements for Supporting Distributed Computing Applications, IEEE Transactions on Computers, vol. 56, No. 12, Dec. 2007, pp. 1629-1642.
Sommers, et al., Router Primitives for Programmable Active Measurement, Proceedings to ACM PRESTO, Barcelona, Spain, Aug. 21, 2009.
Kumar, et al., Towards Optimized Probe Scheduling for Active Measurement Studies, Chapel Hill, North Carolina, USA, Mar. 20, 2011.
Blanton, et al., Resource Management in an Active Measurement Service, Proceedings of the IEEE Global Internet Symposium, Apr. 2008.

* cited by examiner

| Segment hash value | Measurement type | Measurement load | Start time | Time duration | Conflict counter |
|---|---|---|---|---|---|
| 0xabcdef123 | Rate | 100% | 00:01:02 | 25 s | 1 |
| 0x123abcdef | Delay | 1% | 00:01:06 | 10 s | 3 |
| ... | | | | | |

Fig. 4c

| Segment hash value | Conflict counter threshold (Rate) | Conflict counter threshold (Delay) |
|---|---|---|
| 0xabcdef123 | 1 | 10 |
| 0x123abcdef | 2 | 10 |
| ... | | |

Fig. 4d

ADMISSION CONTROL FOR ALLOWING OR REJECTING A MEASUREMENT REQUEST BETWEEN A FIRST AND A SECOND DEVICE

This application is a 371 of International Application No. PCT/SE2013/050391, filed Apr. 11, 2013, the disclosure of which is fully incorporated herein by reference.

TECHNICAL FIELD

The present disclosure relates to measurements in a communication network and in particular to enabling measurements being performed between a first and a second device in the communication network.

BACKGROUND

Communication networks are growing in both size and in the number of different services being provided by the communication networks. The amount of traffic generated by the different services is constantly growing. Customers or users of the services being provided by the communication networks expect the respective services to be delivered fast and without failures, or as few failures and delays as possible.

In order for operators to ensure a good usage of that network capacity and thus to keep delays to a minimum and the number of failures to a minimum, the communication networks are monitored more and more intensely and rigorously in order to both maximise network performance and to quickly discover any failure so that such a failure may be repaired or remedied swiftly.

Large-scale measurements of access network performance are becoming more popular as well as important in the data- and telecommunications industry. This has been recognized by the Internet Engineering Task Force, IETF. At IETF 86 in Orlando (March. 2013) there was a BoF on the topic (LMAP—Large-scale Measurements of Access network Performance).

Large-scale measurements impose several ongoing measurements at the same time. Some measurements consume a high amount of network capacity (e.g. Iperf which is a commonly used network testing tool that can create TCP and UDP data streams and measure the throughput of a network). Such network measurements may conflict with each other in different networks where lots of links are shared between customers. Further, some links may become bottlenecks due to the measurements themselves.

Active probing has long been an accepted method for determining performance parameters of packet-switched networks. The basic concept is to transmit probe packets from a sender towards a receiver. Each probe packet may be time stamped on both sides. The measurement endpoint (MEP) and measurement intermediate point (MIP) functionality and capabilities depends on the network technology deployed.

Existing work on admission control for measurements are primarily based on "earliest deadline first" scheduling. That is, they try to optimize a measurement schedule based on measurement requirements. There are several drawbacks of such solutions:

The scheduling may be too restrictive. For low-overhead measurements of metrics such as delay a measurement system must allow multiple simultaneous measurements.

The computational overhead is significant, in terms of recalculating the Earliest Deadline First, EDF, schedule, when measurement nodes comes and goes (e.g. down for maintenance). Re-calculation is necessary to avoid unused time slots for measurements.

The scheduling of measurements has to be performed at a centralised location.

Complex deployment, any change of a measurement schedule mandates having to update schedule on all measurement nodes.

As described above, measurements that are performed in a large-scale may influence each other and hence reduce the credibility of the results. Further, if no measurement admission control is present some segments of the network may be overloaded due to measurements.

SUMMARY

The object is to obviate at least some of the problems outlined above. In particular, it is an object to provide an Admission Control Node and a method performed thereby for enabling a measurement between a first and a second device in a communication network. It is also an object to provide a first device and a method performed thereby for performing the measurement between the first device and the second device in a communication network. These objects and others may be obtained by providing an Admission Control Node and a first device respectively and a respective method performed by an Admission Control Node and a first device respectively according to the independent claims attached below.

According to an aspect, a method performed by an Admission Control Node for enabling a measurement between a first and a second device in a communication network is provided. The method comprises receiving, from the first device, a request for performing the measurement between the first and the second device and, determining segments comprised in a path between the first and the second device. The method also comprises determining a current measurement situation for the segments, and deciding to allow or reject the request for performing the measurement based on the current measurement situation for the segments. The method further comprises informing the first device about the decision of allowing or rejecting the request for performing the measurement.

According to an aspect, a method performed by a first device for performing the measurement between the first device and the second device in a communication network is provided. The method comprises sending, to an Admission Control Node, a request for performing the measurement between the first and the second device; and receiving, from the Admission Control Node, a decision with regard to the request. The method further comprises when the decision is allowing the first device to perform the measurement, then the method comprises performing the measurement.

According to an aspect, an Admission Control Node adapted for enabling a measurement between a first and a second device in a communication network is provided. The Admission Control Node comprises a receiving unit adapted for receiving, from the first device, a request for performing the measurement between the first and the second device; and a determining unit adapted for determining segments comprised in a path between the first and the second device, and for determining a current measurement situation for the segments. The Admission Control Node also comprises a deciding unit adapted for deciding to allow or reject the request for performing the measurement based on the current measurement situation for the segments, and for informing the first device about the decision of allowing or rejecting the request for performing the measurement.

According to an aspect, a first device adapted for performing the measurement between the first device and the second device in a communication network is provided. The first device comprises a transmitting unit adapted for sending, to an Admission Control Node, a request for performing the measurement between the first and the second device, and a receiving unit, from the Admission Control Node, a decision with regard to the request. The first device also comprises a measurement unit adapted for, when the decision is allowing the first the first device to perform the measurement, performing the measurement.

The method performed by the Admission Control Node, the Admission Control Node, the method performed by the first device and the first device may have several advantages. Measurements may be hindered from influencing each other and the risk of congestion due to measurements may be reduced or even eliminated. The solution works together with standard protocols. The solution does not pose requirements on how the measurements are scheduled and it requires no complex deployment or updates on each node in the communication network. The solution further allows for multiple simultaneous measurements over a path segment if the measurement overhead is low (operator configurable parameters). The computational overhead in the admission controller is low and the solution may be implemented fully centralised (e.g. the Admission Control Node plans and triggers the measurements) or measurements may be triggered independently by the devices.

BRIEF DESCRIPTION OF DRAWINGS

Embodiments will now be described in more detail in relation to the accompanying drawings, in which:

FIG. 4c is an exemplifying hash table of segments and current measurement situation.

FIG. 4d is an exemplifying hash table of conflict counters.

DETAILED DESCRIPTION

Briefly described, an Admission Control Node and a method performed thereby for enabling a measurement between a first and a second device in a communication network are provided. Further, a first device and a method performed thereby for performing a measurement between the first device and a second device in a communication network are provided. The Admission Control Node supervises the measurements being performed in the communication network such that any new request for a measurement to be performed does not adversely affect any ongoing measurements.

Figure 1A:
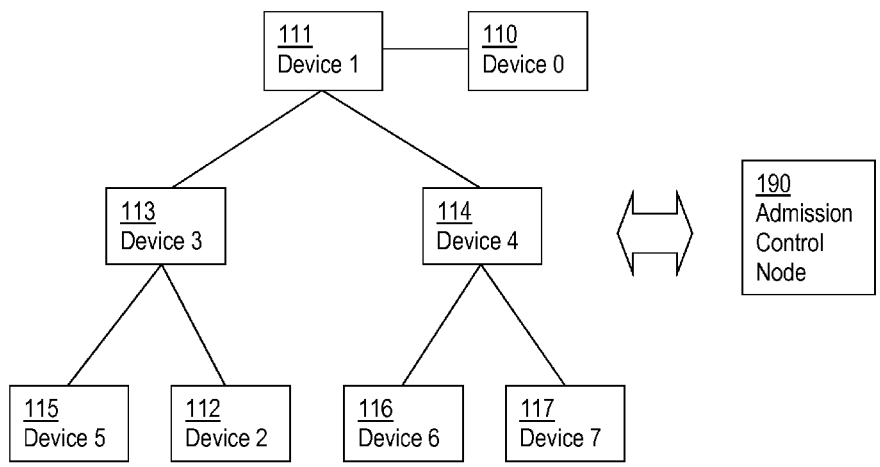
FIG. 1a is a block diagram schematically illustrating a communication network and the topology thereof.
Figure 1B:
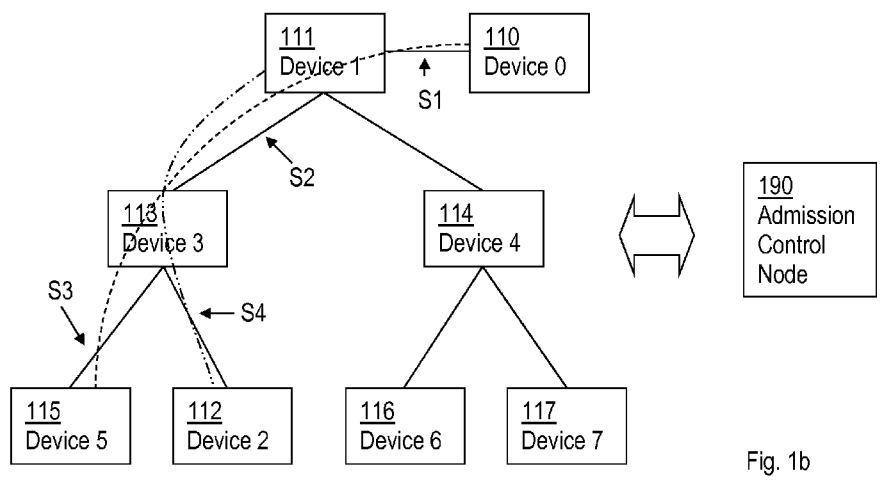
FIG. 1b is a block diagram schematically illustrating a communication network and the topology thereof, wherein two individual measurements may possibly interfere with each other.

A simplified communication network is illustrated in FIGS. 1a and 1b. FIG. 1a is a block diagram schematically illustrating a communication network and the topology thereof. FIG. 1a illustrates eight individual devices 110-117 and an Admission Control Node 190. The devices in this example are arranged more or less in a tree structure. It shall be pointed out that other topologies are equally relevant and the tree structure topology is merely an example. Each of the devices may communicate with the Admission Control Node 190 for requesting to perform a measurement between itself and another device in the communication network. FIG. 1a is schematic and the links to the Admission Control Node 190 are not outlined in the figure.

FIG. 1b is a block diagram schematically illustrating a communication network and the topology thereof, wherein two individual measurements may possibly interfere with, or influence, each other.

In FIG. 1b, two measurements are illustrated, the first between device 1 (with reference sign 111) and device 2 (with reference sign 112). The second measurement is between device 0 (with reference sign 110) and device 5 (with reference sign 115). The first measurement between device 1 and device 2 comprises two segments S2 and S4 in the path between device 1 and device 2. The second measurement between device 0 and device 5 comprises three segments S1, S2 and S3 in the path between device 0 and device 5. As can be seen in the figure, segment S2 is involved in both the first and the second measurement and hence the two measurements may interfere with, or influence, each other. If both the first and the second measurement induce a lot of traffic or load, e.g. to measure the throughput, then the segment S2 may be overloaded and hence two measurements interfere with each other. If the two measurements are not performed concurrently, then a more accurate measurement result may be obtained.

Embodiments of a method performed by the Admission Control Node will now be described with reference to FIG.

Figure 2:
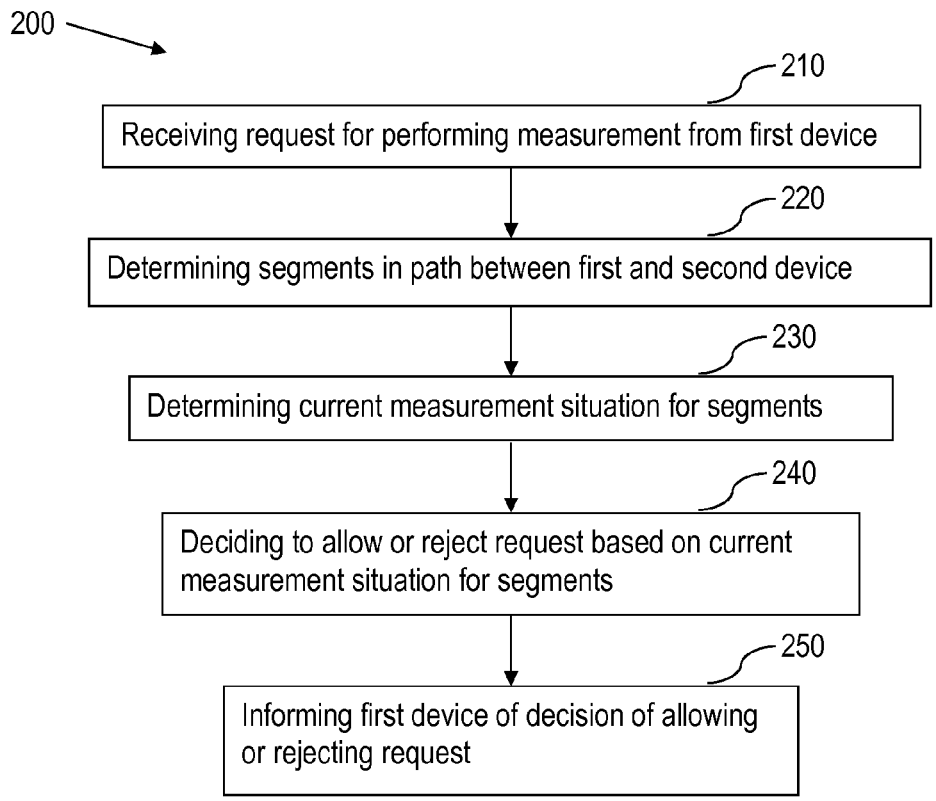
FIG. 2 is a flowchart of a method performed by an Admission Control Node for enabling a measurement between a first and a second device in a communication network according to an exemplifying embodiment.

2. FIG. 2 illustrates the method performed by the Admission Control Node for enabling a measurement between a first and a second device in a communication network comprising receiving 210, from the first device, a request for performing the measurement between the first and the second device and, determining 220 segments comprised in a path between the first and the second device. The method also comprises determining 230 a current measurement situation for the segments, and deciding 240 to allow or reject the request for performing the measurement based on the current measurement situation for the segments. The method further comprises informing 250 the first device about the decision of allowing or rejecting the request for performing the measurement.

When the first device wishes to perform a measurement towards the second device, the first device may not just go ahead and perform the measurement. This is because the measurement may affect any possible ongoing measurements on all or parts of the path between the first device and the second device as described above. Before the first device may perform the measurement, the first device firstly has to make sure that the measurement will not adversely affect any ongoing measurement on all or parts of the path between the first and second device.

In order to do so, the first device sends a request to the Admission Control Node. The Admission Control Node receives this request in action 210. The request comprises information identifying the first and the second device and the Admission Control Node determines 220 the segments comprised in the path between the first and the second device. Looking at FIGS. 1*a* and 1*b*, a segment is a link between two physical entities. The link may be wireless or a wire/cable connecting the two entities or devices. The entities or devices may be e.g. physical or virtual machines. If the two entities or devices correspond to the first and the second device, then the path between the devices comprises just this one segment. However, as schematically illustrated in FIGS. 1*a* and 1*b*, there may be a plurality of segments in the path between the first and the second device. In a communication network, there may be a substantial amount of segments in a path between the first and the second device, even if FIGS. 1*a* and 1*b* merely illustrates a few segments and a few devices.

Once, the Admission Control Node has determined the segments comprised in the path between the first and the second device, the Admission Control Node determines 230 the current measurement situation for the segments in the path. Again looking at FIG. 1*b*, assume that "Device 0" (being then the first device) has sent the request for performing the measurement to the Admission Control Node, and that the request indicates "Device 5" as the second device. The Admission Control Node has then determined that segments S1, S2 and S3 are comprised in the path between the two devices. The Admission Control Node then determines 230 the current measurement situation for the segments in the path. In other words, for each of the segments S1, S2 and S3 the Admission Control Node determines the number of ongoing measurements and the type of each of the ongoing measurement currently being performed over the individual segments. This enables the Admission Control Node to determine how highly loaded each segment currently is with regard to measurements and if each segment is able to support yet another measurement without affecting any of the ongoing measurements. Not only may the ongoing measurements affect the requested measurement, but the requested measurement may also affect the ongoing measurements.

The Admission Control Node then decides 240 to allow or to reject the request for performing the measurement based on the current measurement situation for the segments and informs 250 the first device about the decision of allowing or rejecting the request for performing the measurement.

The method performed by the Admission Control Node may have several advantages. Measurements may be hindered from influencing each other and the risk of congestion due to measurements may be reduced or even eliminated. The solution works together with standard protocols. The solution does not pose requirements on how the measurements are scheduled and it requires no complex deployment or updates on each node in the communication network. The solution further allows for multiple simultaneous measurements over a path segment if the measurement overhead is low (operator configurable parameters). The computational overhead in the admission controller is low and the solution may be implemented fully centralised (e.g. the Admission Control Node plans and triggers the measurements) or measurements may be triggered independently by the devices.

The request for performing the measurement may comprise information of the type of measurement to be performed between the first and the second device, wherein deciding 240 to allow or reject the request for performing the measurement further is based on the type of measurement.

In order for the Admission Control Node to make a well-founded decision whether to allow or reject the request for performing the measurement, the first device includes information about the type of measurement in the request. Different types of measurements may generate more or less additional traffic or load on the segments in the path between the first and the second communication device. When the Admission Control Node determines the current measurement situation for the segments, the Admission Control Node gathers information of how heavily loaded each segment currently is with ongoing measurements. Since the Admission Control Node also is provided with the type of measurement that the first device wishes to perform towards the second device, the Admission Control Node is enabled to analyse how much traffic or load would be added to each of the segments due to the requested measurement and if each of the segments can support the additional load without the different measurements adversely affecting or influencing each other.

According to an embodiment, deciding 240 to allow or reject the request comprises determining a point in time when the first device is allowed to perform the requested measurement or determining a backoff time that the first device wait before requesting to perform the measurement anew.

When the Admission Control Node determines the current measurement situation for the segments, the Admission Control Node gathers information of how heavily loaded each segment currently is with ongoing measurements and also how long each of the ongoing measurements will last in time before they are done. It may be that due to the current measurement situation for the segments, the requested measurement cannot be performed instantly, but that at least one of the currently ongoing measurements will terminate in e.g. 0.5 seconds, 30 seconds or 1 minute. Then the Admission Control Node may allow the requested measurement but determine a point in time when the first device is allowed to perform the requested measurement, typically when the requested measurement may be performed without adversely affecting (or adversely being affected by) any currently ongoing measurement. Merely as an example, when the Admission Control Node informs 250 the first device about the decision of allowing the request for performing the measurement, the Admission Control Node also informs the first device that it may not start performing the measurement until the expiration of 5 seconds.

The Admission Control Node may also find out, when determining the current measurement situation for the segments, that the requested measurement cannot be performed due to that none of the current ongoing measurements will terminate or be done on e.g. 2 minutes and the requested measurement would incur relatively high traffic load on the segments in the path. Then the Admission Control Node may decide to reject the request for performing the measurement but also that the first device should backoff for 2 minutes and then send the request for performing the measurement again. Thus the Admission Control Node informs 250 the first device about the rejection and that the device may send the request anew in 2 minutes.

According to yet an embodiment, determining 230 the current measurement situation for the segments comprises, for each segment comprised in the path between the first and the second device, determining the number of and type of any ongoing measurement and the duration of the ongoing measurements by looking in a database having an entry for each segment comprised in the communication network having ongoing measurements being performed.

The Admission Control Node may have a database or memory incorporated into it or may have access to a database, memory, table, record or the like in which each segment in the communication network is stored so that the Admission Control Node may determine which segments are comprised in the path between two devices, e.g. the first and the second device. The database may also comprise information about each segment with regard to the current measurement situation. In other words, for each segment in the database (and hence in the communication network) information is available pertaining to any ongoing measurement, the type of measurement and the traffic load the measurement generates. Also, the database comprises, for each segment and for each currently ongoing measurement, the duration of each respective measurement so that the Admission Control Node may easily obtain information about the current measurement situation for each segment in the communication network and any possible change in the near future due to any currently ongoing measurements being terminated in the near future.

According to still an embodiment, the method further comprises, for each segment comprised in the path between the first and the second device which are present in the database, determining if the current measurement situation allows for the requested measurement to be performed based on the current measurement situation and the type and duration of the requested measurement.

With the information pertaining to the type of requested measurement, the types and durations of any currently ongoing measurements on the segments in the path between the first and the second device, the Admission Control Node is enabled to deduce, per segment, if the current measurement situation allows for the requested measurement to be performed. The Admission Control Node is also enabled to determine a point in time when the first device may be allowed to perform the measurement or a point in time when the first device may request to perform the measurement anew. The Admission Control Node thus has control of the measurement traffic or situation in the communication network with respect to each segment. Looking again at FIG. 1*b*, it only takes one segment in the path being a bottleneck, e.g. S2, to interfere with a measurement. Thus, if one segment out of many on a path may adversely affect, or be affected by, the requested measurement may be rejected by the Admission Control Node.

According to yet an embodiment, when a segment comprised in the path between the first and the second device is not present in the database, the method comprises creating and inserting an entry into the database for the segment, the created entry comprising information about the type of and duration of the requested measurement.

In case the database does not comprise at least one of the segments in the path between the first and the second device, then the Admission Control Node creates and inserts an entry for the segment in the database. For example, the database may only comprise all segments in the communication network ever having been involved in a measurement or having currently ongoing measurements. In an example, a new device is added to the communication network and only the first time when the new device is involved in a measurement, the segments in the path from the device and an already existing device are added to the database. Hence, if the Admission Control Node cannot find all the segments in the path between the first and the second device, then the Admission Control Node creates and inserts an entry for the segment in the database. Further, the entry comprises information about the type of and duration of the requested measurement in case the Admission Control Node decides to allow the requested measurement.

When it is decided to allow the measurement, the method comprises updating 250 the database so that the number of ongoing current measurements and the type of ongoing measurements for each segment involved in the measurement is updated.

The database should always be updated so that the Admission Control Node is enabled to make well-founded and correct decisions on oncoming requests for measurements. Hence, when the Admission Control Node decides to allow the measurement, the Admission Control Node also updates the database accordingly. In addition to the number of currently ongoing measurements and the type of ongoing measurements for each segment involved in the measurement, the database may also comprise, and be updated with, a consumption ratio of each segment. For example, one type of measurement may use 20% of the capacity of a segment, a second type of measurement may use 50% and a third type may use 100% of the capacity of a segment. Consequently, if e.g. the path between the first and the second device comprises a path having a currently ongoing measurement requiring 100% of the capacity of that segment, no additional measurement may be allowed on that path until the currently ongoing measurement requiring 100% of the capacity is over, i.e. has terminated.

When the measurement is terminated, the method comprises updating 260 the database so that the number of ongoing current measurements for each segment involved in the measurement is updated.

For the same reasons as for updating the database when a requested measurement is allowed, the database should be updated when the requested measurement is terminated. The first device may in an example inform, by signalling to, the Admission Control Node that the measurement is over and terminated so that the Admission Control Node may update the database accordingly. In another example, each type of measurement has a predefined length in time and hence the Admission Control Node may start an internal timer when the requested measurement is decided to be allowed, taking into account a possible delay until the first device is allowed to start the requested measurement, and when the timer lapses or expires, then the Admission Control Node updates the database. In still another example, the request for performing the measurement comprises a time indication for how long the first device wishes to perform the measurement and the Admission Control Node may there from determine when an allowed requested measurement is terminated. In yet another example, the Admission Control Node determines, for each request, how long the first device is allowed to perform the measurement and informs the first device about how long the first device is allowed to perform the measurement when the Admission Control Node informs 250 the first device about the decision of allowing the request for performing the measurement. In this manner, the Admission Control Node may determine when an allowed requested measurement is terminated without receiving any information from the first device upon termination of a measurement.

According to an embodiment, the segments in the database are represented by hash codes, wherein determining existence in the database is performed using a Bloom filter.

An advantage with hash codes is that they require little computational overhead and storage. A database or table of hash codes are relatively fast to search through. A Bloom filter is a space-efficient probabilistic data structure that is used to test whether an element is a member of a set. Hence, a the database using hash codes together with the Bloom filter is both fast of relatively low complexity to find whether a segment is part of the database or not. In an example, a segment is only part of the database if there are ongoing measurements over that segment. The hash values and bloom filters are a way of finding the existence of a set of segments in the database. This provides a fast way of seeing whether we can accept a new measurement. The Admission Control Node may search through the hash table database using the bloom filter and if no existence of segments in the path between the first and second device is reported the Admission Control Node may accept the measurement request.

According to still an embodiment, the requested measurement and any ongoing measurements are active measurements incurring increased traffic on the segments in the path between the first and the second device.

An active measurement is a measurement that generates packets or traffic for performing the measurement. Different characteristics may be measured with active measurements, e.g. rate, delay, jitter and loss. In order to measure any of these characteristics with active measurements, at least one packet is generated by the first device and transmitted to the second device, wherein the second device may measure any of the characteristics or reflect the packet towards the first device. How the measurement itself is performed is due to the protocol used for the measurement. Examples of different measurement protocols are Two-Way Active Measurement Protocol, TWAMP, Cisco Service Level Agreement, CiscoSLA, and Internet Control Message Protocol, ICMP.

TWAMP is an example of a protocol, or technology, for active measurements developed by the Internet Engineering Task Force (IETF). The architecture of TWAMP consists of 4 logical elements:
 a control client responsible for starting and stopping TWAMP sessions,
 a session-sender responsible sending TWAMP test packets,
 a session-reflector responsible for returning TWAMP test packets to the session-sender, and
 a server responsible for managing one or several TWAMP sessions.

These logical elements can be grouped together or being separated on different network nodes as described by the standard. When a control-client wishes to perform a measurement between $MP_A$ (first device) and $MP_B$ (second device) it will inform the server via the TWAMP control plane. The current control plane supports sending information related to measurement duration, number of measurement packets, end points, et cetera.

The server will respond back to the control-client with one of the following values (also part of existing standard): {OK, Failure, internal error, request not supported, not OK due to permanent resource limitations, not OK due to temporary resource limitations}.

In this example, that is the admission control functionality (Admission Control Node), may reside in (or be implemented in) the TWAMP server. The server also needs to be able to obtain path information between $MP_A$ and $MP_B$ (e.g. via a path computation engine) for admission control per segment/link.

If the control-client receives an OK from the server it will start a measurement between the session-sender and session-reflector. If the control-client receives a {not OK due to permanent resource limitations, not OK due to temporary resource limitations} it will back off and try again at a later point in time.

In an example, the request for performing a measurement comprises a plurality of individual measurements, or is a request for performing a plurality of individual measurements. The plurality of individual measurements may relate to different types of measurements and between the first device and different other devices, not just the second device. The Admission Control Node is then adapted to either consider the plurality of individual measurements as a whole or to go through the plurality of individual measurements one by one.

In case the Admission Control Node goes through the plurality of individual measurements one by one, the Admission Control Node will determine, for each individual measurement comprised in the request, segments comprised in a path between the first and another device for which the individual measurement is concerned. The other device for which the individual measurement is concerned may be the second communication device, but it may be a third device, a forth device and so on, since not all measurements need to be performed between the only the first device and the second device. Then, for each individual measurement comprised in the request, the Admission Control Node determines a current measurement situation for the respective segments in the path between the first device and the other device. The Admission Control Node then, for each individual measurement comprised in the request, decides allow or reject the request for performing the measurement based on the current measurement situation for the segments and informs the first device about the decision of allowing or rejecting the request for performing the individual measurements.

The Admission Control Node may either go through the individual measurements as they are listed in the request, or apply any prioritisation rule available to the Admission Control Node.

An example of the request for performing measurements comprising a plurality of measurements to be performed is for an Ethernet E-LINE (which is a service providing point-to-point connection between a pair of user-network-interfaces) or MPLS-TP (MultiProtocol Label Switching Transport Profile). The first device is in this example a service manager which requests monitoring by measuring all service parameters in a Service Level Agreement, SLA, e.g. capacity, delay and loss at the same time.

Embodiments herein also relate to a method performed by a first device for performing a measurement between the first device and a second device in a communication network. Such embodiments will now be described with reference to FIGS. 3a and 3b.

Figure 3A:
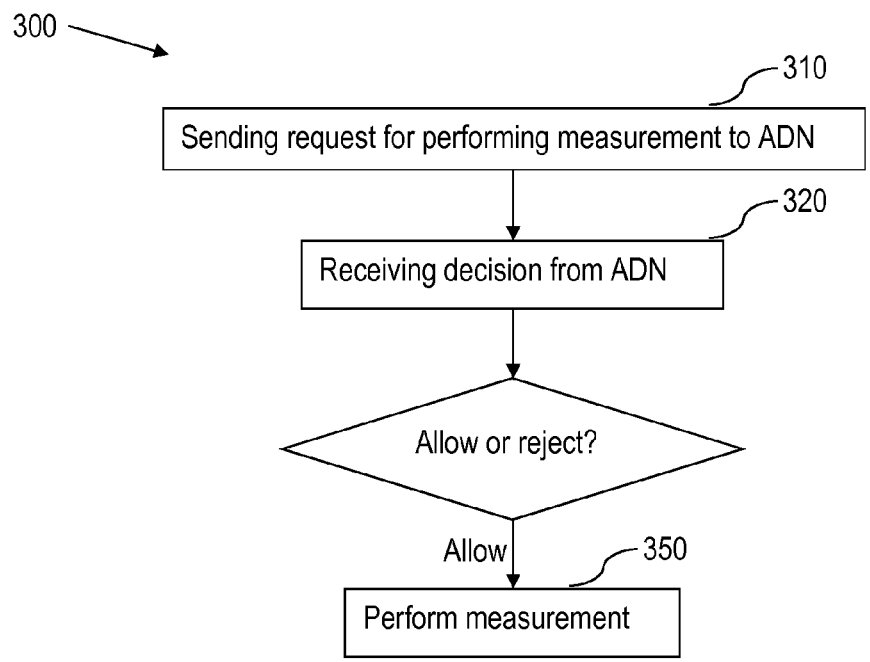
FIG. 3a is a flowchart of a method performed by a first device for performing a measurement between the first device and a second device in a communication network according to an exemplifying embodiment.

FIG. 3a illustrates the method 300 performed by the first device for performing the measurement between the first device and the second device in a communication network comprising sending 310, to an Admission Control Node, a request for performing the measurement between the first and the second device; and receiving 320, from the Admission Control Node, a decision with regard to the request. The method further comprises when the decision is allowing the first device to perform the measurement, then the method comprises performing 350 the measurement.

When the first device wishes to perform a measurement towards the second device, the first device may not just go ahead and perform the measurement. This is because the measurement may affect any possible ongoing measurements on all or parts of the path between the first device and the second device as described above. Before the first device may perform the measurement, the first device firstly has to make sure that the measurement will not adversely affect any ongoing measurement on all or parts of the path between the first and second device.

In order to do so, the first device sends 310 the request to the Admission Control Node. Comparing with FIG. 2, this request is received by the Admission Control Node in action 210. Reverting to FIG. 3a, the first device receives 320 a decision with regard to the request from the Admission Control Node. Again comparing with FIG. 2, this is informing 250 the first device of allowing or rejecting the request. Reverting to FIG. 3a, if the Admission Control Node has decided to allow the requested measurement, then the first device may perform 350 the measurement towards the second device.

The method performed by the first device may have several advantages. Measurements may be hindered from influencing each other and the risk of congestion due to measurements may be reduced or even eliminated. The solution works together with standard protocols. The solution does not pose requirements on how the measurements are scheduled and it requires no complex deployment or updates on each node in the communication network. The solution further allows for multiple simultaneous measurements over a path segment if the measurement overhead is low (operator configurable parameters). The computational overhead in the admission controller is low and the solution may be implemented fully centralised (e.g. the Admission Control Node plans and triggers the measurements) or measurements may be triggered independently by the devices.

Figure 3B:
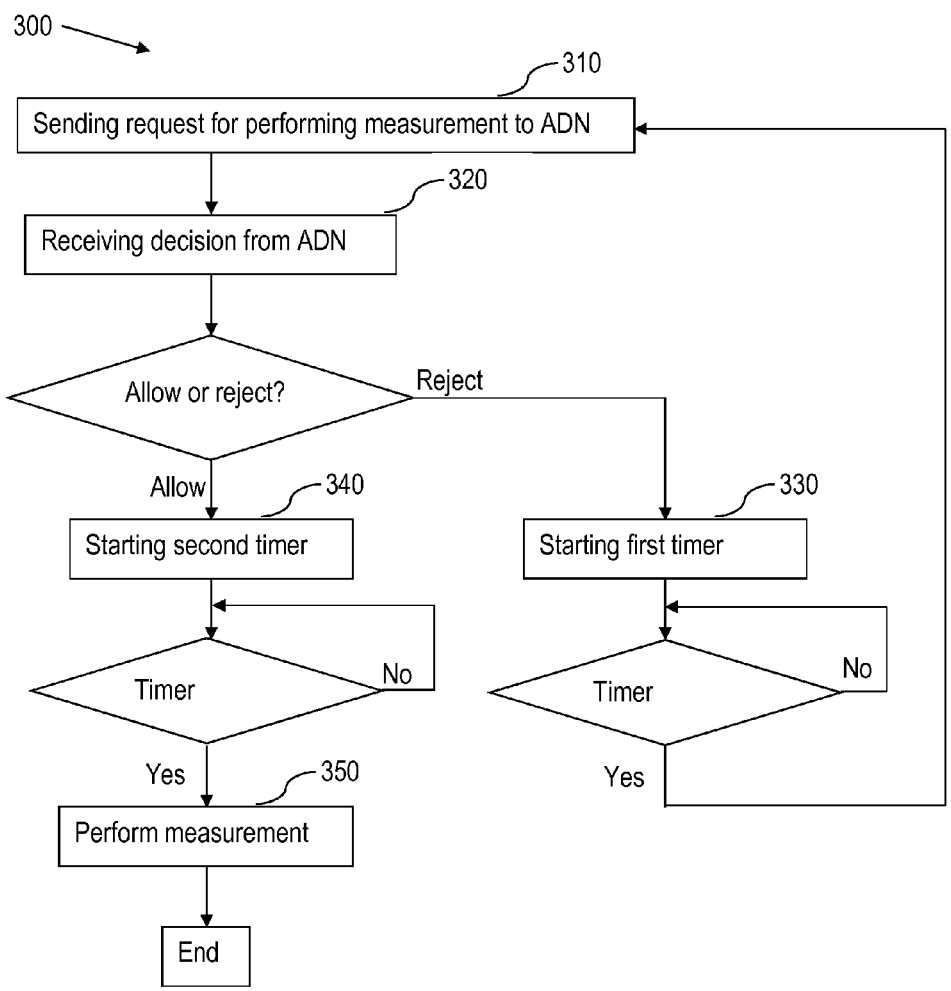
FIG. 3b is a flowchart of a method performed by the first device for performing a measurement between the first device and a second device in a communication network according to another exemplifying embodiment.

According to an embodiment, illustrated in FIG. 3b, when the decision is rejecting the request, the method further comprises starting 330 a first timer having a length corresponding to a backoff time comprised in the received decision, and when the first timer expires, sending 310, to the Admission Control Node, a new request for performing the measurement between the first and the second device.

Looking at FIG. 3b, the first device receives 320 a decision with regard to the request from the Admission Control Node. In case the decision is to reject the request for performing the measurement, the received decision also comprises a backoff time. The backoff time informs the first device of how long the first device at least must wait until the first device sends a new request for performing the measurement to the Admission Control Node. The first device may wait longer than the backoff time or may decide not to send a new request for performing the measurement. However, the first device may also start 330 a first timer having the length of the backoff time and then the first device waits until the first timer expires, which means the backoff time has lapsed, and then the first device may send 310 the request for performing the measurement to the Admission Control Node again.

According to yet an embodiment, when the decision is allowing the request, the method further comprises starting 340 a second timer having a length corresponding to a waiting time comprised in the received decision, and when the second timer expires, performing 350 the measurement between the first and the second device.

Looking again at FIG. 3b, the first device receives 320 a decision with regard to the request from the Admission Control Node. In case the decision is to allow the request for performing the measurement, the received decision also comprises a waiting time. The waiting time informs the first device of how long the first device at least must wait until the first device performs the measurement. The first device thus starts 340 a second timer and waits for the second timer to expire, which means the waiting time has lapsed, and then the first device may perform 350 the requested measurement. The reason why the first device should wait before starting to perform the measurement has been described above. E.g. the Admission Control Node has deduced that the current measurement situation for the segments in the path between the first and the second device is such that the requested measurement may be performed once a currently ongoing measurement has terminated, which will occur once the waiting time has lapsed.

Figure 4A:
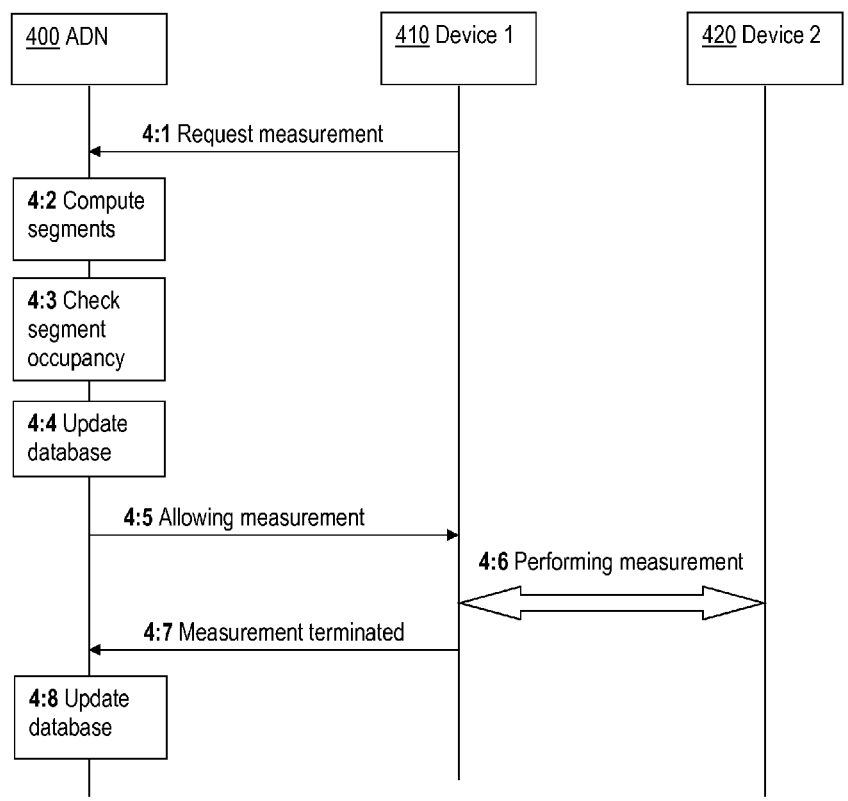
FIG. 4a is an exemplifying signalling diagram between a first device and an Admission Control Node for enabling a measurement between the first and a second device in a communication network.

FIG. 4a is an exemplifying signalling diagram between the first device 410 and the Admission Control Node 400 for enabling a measurement between the first and the second device 410 and 420 in a communication network.

Firstly, the first device 410 determines that it would like to perform a measurement of a specific type between itself and the second device 420. The first device sends 4:1 a request for performing the measurement to the Admission Control Node 400. The Admission Control Node 400 determines 4:2 the segments comprised in the path between the first and the second device; and 4:3 a current measurement situation for the segments and decides to allow the request for performing the measurement based on the current measurement situation for the segments. The Admission Control Node 400 also updates 4:4 the database so that all the segments are updated with the number and the type of ongoing measurements and also the duration of the same.

The Admission Control Node 400 further informs 4:5 the first device about the decision of allowing the request for performing the measurement. The first device 410 then performs 4:6 the measurement with, or towards, the second device 420. Once the measurement is terminated, the first device informs 4:7 the Admission Control Node that the measurement is terminated.

Alternatively, as described above, the Admission Control Node may keep track of how long the allowed requested measurement will be performed and hence will know when the allowed requested measurement will terminate. Thus action 4:7 is only present in this exemplifying embodiment.

However, once the allowed requested measurement is over, i.e. has terminated, the Admission Control Node updates 4:8 the database accordingly.

Figure 4B:
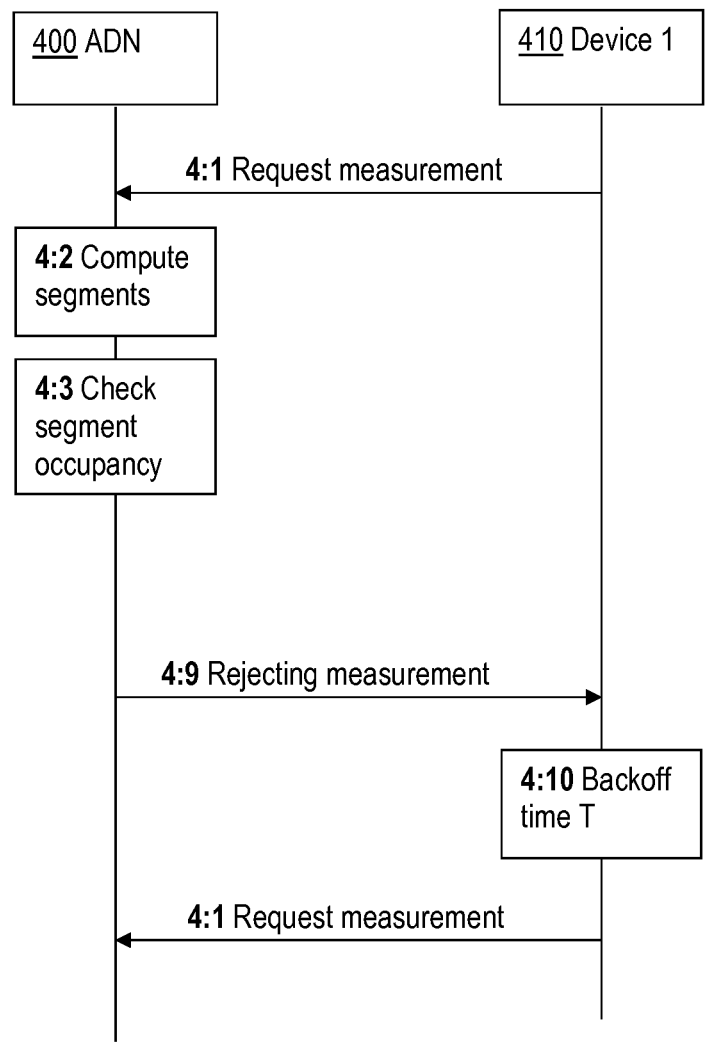
FIG. 4b is another exemplifying signalling diagram between a first device and an Admission Control Node for enabling a measurement between the first and a second device in a communication network.

FIG. 4b is another exemplifying signalling diagram between the first device and the Admission Control Node for enabling a measurement between the first and the second device in the communication network.

Firstly, the first device 410 determines that it would like to perform a measurement of a specific type between itself and the second device 420. The first device sends 4:1 a request for performing the measurement to the Admission Control Node 400. The Admission Control Node 400 determines 4:2 the segments comprised in the path between the first and the second device; and 4:3 a current measurement situation for the segments and decides to reject the request for performing the measurement based on the current measurement situation for the segments. The Admission Control Node informs 4:9 the first device about the decision to reject the request and encloses a backoff time, T, in the decision to reject the request. The first device then starts 4:10 a backoff timer having length T and once the backoff timer expires, the first device sends 4:1 the request for performing the measurement to the Admission Control Node again.

FIG. 4c is an exemplifying hash table of segments and current measurement situation. FIG. 4d is an exemplifying hash table of conflict counters.

FIG. 4c illustrates an example of the database comprising a table of segments having currently ongoing measurements being performed. The exemplifying hash table of FIG. 4c comprises two segments represented by hash values having ongoing measurements being performed. On the first (top) segment in the table illustrated in FIG. 4c, the rate of the segment is being measured, or in more detail, the rate between two devices is being measured wherein the segment is comprised in the path between the two devices. This type of measurement takes 100% the capacity of the segment and the measurement is scheduled to start in 1 minute and 2 seconds and it will last 25 seconds. There is only one scheduled measurement of this type on this segment and hence the conflict counter is set to 1. If a subsequent request for measurement of e.g. rate between two devices is received by the Admission Control Node and this particular segment is comprised also in the path between the two devices concerned in the subsequent request for measurement, the Admission Control Node will find that this particular segment exists in the table and has a conflict counter of 1. The Admission Control Node may then look in the table illustrated in FIG. 4d and see that the conflict counter threshold for this particular segment and for the measurement type "Rate" is 1, i.e. the same as the conflict counter in the table illustrated in FIG. 4c. Hence the conflict counter has reached its threshold and the requested measurement cannot be allowed. The Admission Control Node may reject the request and optionally enclose a backoff time of e.g. 25 or 26 seconds, since that is the duration of the already scheduled measurement. Then the device sending the subsequent request for measurement for rate may send a new request, i.e. repeat the request. The Admission Control Node may alternatively allow the subsequent request for measurement for rate but then enclose a waiting time of e.g. 26 seconds in the decision sent to the requesting device so that the requesting device does not initiate the measurement until the already scheduled measurement has been performed and is terminated.

On the second (bottom) segment in the table illustrated in FIG. 4c, the delay of the segment is being measured, or in more detail, the delay between two devices is being measured wherein the segment is comprised in the path between the two devices. This type of measurement takes 1% the capacity of the segment and the measurement is scheduled to start in 1 minute and 6 seconds and it will last 10 seconds. There are 3 scheduled measurement of this type on this segment and hence the conflict counter is set to 3. If a subsequent request for measurement of e.g. delay between two devices is received by the Admission Control Node and this particular segment is comprised also in the path between the two devices concerned in the subsequent request for measurement, the Admission Control Node will find that this particular segment exists in the table and has a conflict counter of 3. The Admission Control Node may then look in the table illustrated in FIG. 4d and see that the conflict counter threshold for this particular segment and for the measurement type "Delay" is 10, i.e. higher than the conflict counter in the table illustrated in FIG. 4c. Hence the conflict counter has not reached its threshold and the requested measurement may be allowed. The Admission Control Node may thus allow the request.

Below, an implementing example is illustrated. Assume the communication network is just started and the database is empty. Once the Admission Control Node receives the request for performing the measurement, the Admission Control Node first creates a first empty hash table in the database. The hash table has entries for individual segments in the path between the first and the second device. The entries for each segment may have the form of <H(segment), measurement type, measurement load, start time, time duration, conflicting counter>, where H(segment) is a hash function based on segment identifiers, e.g. two IP addresses or interfaces. Conflicting counter provides information of how many currently ongoing measurements are being performed.

The Admission Control Node further creates a second hash table having entries for individual segments of the form <H(segment), conflicting counter (Rate) threshold, conflicting counter (Delay) threshold >. The second table indicates how many current ongoing measurements are possible to allow on a segment without the measurements interfering with each other. The Admission Control Node schedules the measurement between the first and the second device.

The Admission Control Node determines the segments of the path between the first and the second device. The Admission Control Node may determine the segments in the path from a database or from a path computation engine, traceroute (IP networks) measurements, link trace (Ethernet networks) measurements, or a topology map. The Admission Control Node then computes a hash function for each segment, $s_i$, in the path. Set S'=empty set and for each segment, $s_i$: determine if $s_i$ is in S, e.g. by means of e.g. a Bloom filter. If not, then add segment to S' and set measurement load and time interval based on the result of the scheduling. The Admission Control Node sets the conflicting counter to 1. If $s_i$ is in S, then increase the conflicting counter for that segment. Check with the second hash table of conflicting counter is lower than threshold for each segment $s_i$ in the path, and if so then add segment in S' to S and allow measurement. The allowing of the measurement may be done by triggering measurements using a control protocol e.g. TWAMP or CiscoSLA, or by sending a decision indicating the allowing of the measurement to the requesting device.

Once the measurement duration has lapsed, then remove S' from S. If the conflicting counter >1, then keep that segment in S but decrease conflicting counter by 1.

If the check with the second hash table of conflicting counter indicates that the conflicting counter is higher than threshold for at least one segment, then put the measurement on hold or send a decision to reject the requested measurement with a backoff time.

Embodiments herein also relate to an Admission Control Node adapted for enabling a measurement between a first and a second device in a communication network. Such embodiments will now be described with reference to FIG. 5. The Admission Control Node has the same technical features, objects and advantages as the method performed by the Admission Control Node for enabling the measurement between the first and the second device in the communication network. The Admission Control Node will only be described in brief in order to avoid unnecessary repetition.

Figure 5:
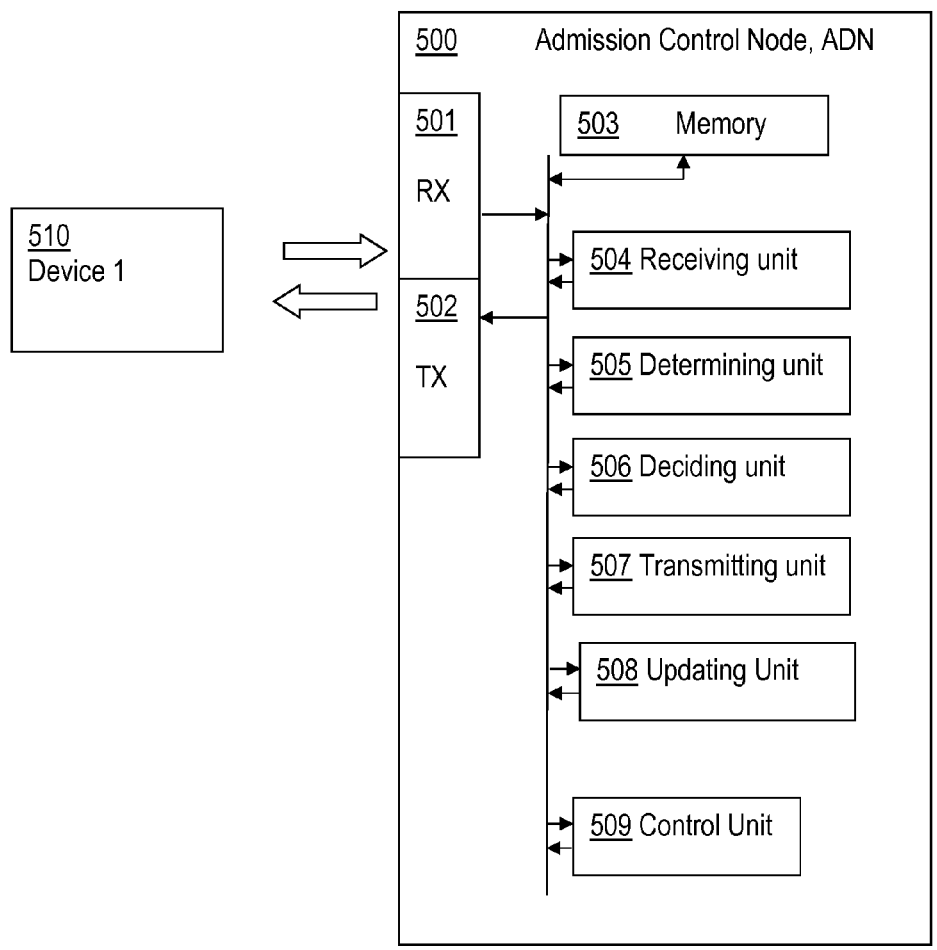
FIG. 5 is a block diagram of an Admission Control Node adapted for enabling a measurement between a first and a second device in a communication network according to an exemplifying embodiment.

FIG. 5 is a block diagram of an Admission Control Node adapted for enabling the measurement between the first and the second device in the communication network according to an exemplifying embodiment. FIG. 5 illustrates the Admission Control Node comprising a receiving unit 504 adapted for receiving, from the first device, a request for performing the measurement between the first and the second device; and a determining unit 505 adapted for determining segments comprised in a path between the first and the second device, and for determining a current measurement situation for the segments. The Admission Control Node also comprises a deciding unit 506 adapted for deciding to allow or reject the request for performing the measurement based on the current measurement situation for the segments, and for informing the first device about the decision of allowing or rejecting the request for performing the measurement.

The Admission Control Node has the same advantages as the method performed by the Admission Control Node. Measurements may be hindered from influencing each other and the risk of congestion due to measurements may be reduced or even eliminated. The solution works together with standard protocols. The solution does not pose requirements on how the measurements are scheduled and it requires no complex deployment or updates on each node in the communication network. The solution further allows for multiple simultaneous measurements over a path segment if the measurement overhead is low (operator configurable parameters). The computational overhead in the admission controller is low and the solution may be implemented fully centralised (e.g. the Admission Control Node plans and triggers the measurements) or measurements may be triggered independently by the devices.

The request for performing the measurement may comprise information of the type of measurement to be performed between the first and the second device, wherein the deciding unit 506 further may be adapted for deciding to allow or reject the request for performing the measurement based on the type of measurement.

The request for performing the measurement may comprise information of the type of measurement to be performed between the first and the second device, wherein the deciding unit 506 further may be adapted for deciding to allow or reject the request for performing the measurement based on the type of measurement.

In an example, the determining unit 505 is adapted for determining the current measurement situation for the segments by, for each segment comprised in the path between the first and the second device, determining the number of and type of any ongoing measurement and the duration of the ongoing measurements by looking in a database having an entry for each segment comprised in the communication network having ongoing measurements being performed.

The database may be the comprised in the memory arrangement 503 of the Admission Control Node or it may be an external database accessible to the Admission Control Node.

In yet an example, the determining unit 505 is adapted for determining, for each segment comprised in the path between the first and the second device which are present in the database, if the current measurement situation allows for the requested measurement to be performed based on the current measurement situation and the type and duration of the requested measurement.

In still an example, the determining unit 505 is adapted for, when a segment comprised in the path between the first and the second device is not present in the database, creating and inserting an entry into the database for the segment, the created entry comprising information about the type of and duration of the requested measurement.

The deciding unit 506 may be adapted for, when the deciding unit 506 has decided to allow the measurement, updating 250 the database so that the number of ongoing current measurements and the type of ongoing measurements for each segment involved in the measurement is updated.

The updating unit 508 is in an example adapted for, when the measurement is terminated, updating the database so that the number of ongoing current measurements for each segment involved in the measurement is updated.

In an example, the segments in the database are represented by hash codes, wherein the determining unit is adapted for determining existence in the database is by using a Bloom filter.

In yet an example, the requested measurement and any ongoing measurements are active measurements incurring increased traffic on the segments in the path between the first and the second device.

Embodiments herein also relate to a first device adapted for performing a measurement between the first device and a second device in a communication network. Such embodiments will now be described with reference to FIG. 6. The first device has the same technical features, objects and advantages as the method performed by the first device for performing the measurement between the first and the second device in the communication network. The first device will only be described in brief in order to avoid unnecessary repetition.

Figure 6:
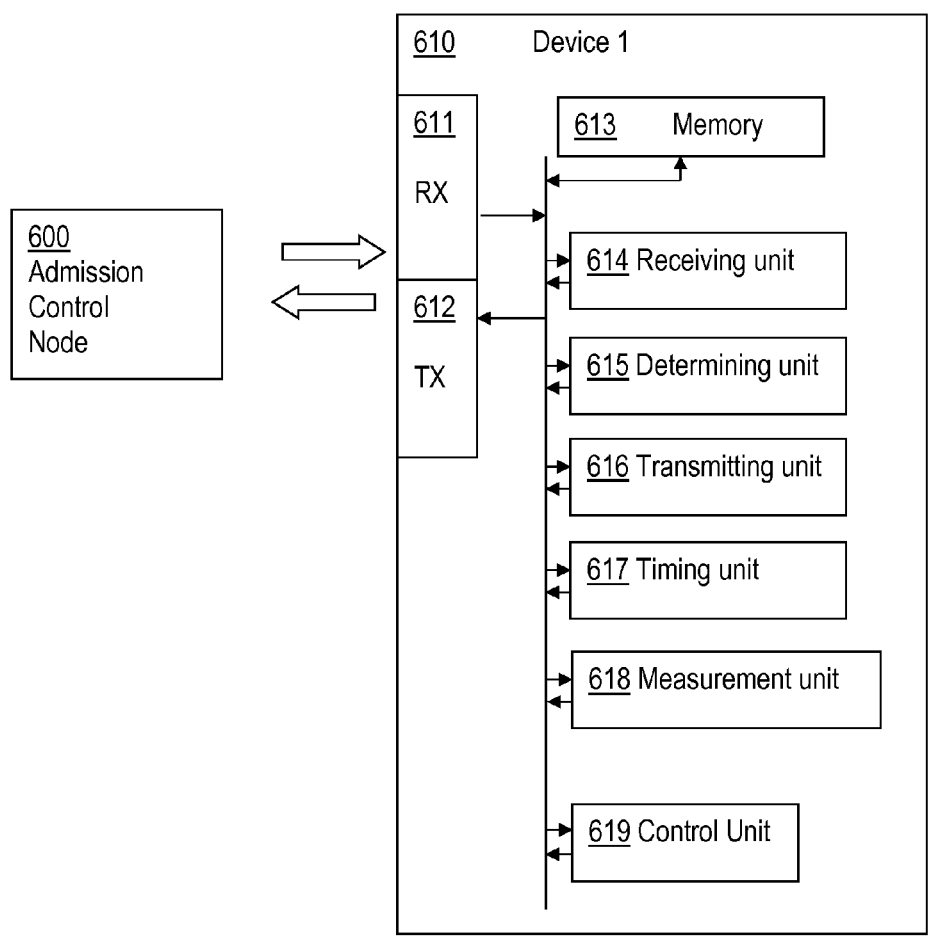
FIG. 6 is a block diagram of a first device adapted for performing a measurement between the first device and a second device in a communication network according to an exemplifying embodiment.

FIG. 6 is a block diagram of a first device adapted for performing the measurement between the first device and the second device in the communication network according to an exemplifying embodiment. FIG. 6 illustrates the first device 610 comprising a transmitting unit 616 adapted for sending, to an Admission Control Node, a request for performing the measurement between the first and the second device, and a receiving unit 614, from the Admission Control Node, a decision with regard to the request. The first device also comprises a measurement unit 618 adapted for, when the decision is allowing the first the first device to perform the measurement, performing the measurement.

The first device has the same advantages as the method performed by the first device. Measurements may be hindered from influencing each other and the risk of congestion due to measurements may be reduced or even eliminated. The solution works together with standard protocols. The solution does not pose requirements on how the measurements are scheduled and it requires no complex deployment or updates on each node in the communication network. The solution further allows for multiple simultaneous measurements over a path segment if the measurement overhead is low (operator configurable parameters). The computational overhead in the admission controller is low and the solution may be implemented fully centralised (e.g. the Admission Control Node plans and triggers the measurements) or measurements may be triggered independently by the devices.

The first device 610 may further comprise a timing unit 617 adapted for, when the decision is rejecting the request, starting a first timer having a length corresponding to a backoff time comprised in the received decision, wherein the transmitting unit 616 is adapted for, when the first timer expires, sending a new request for performing the measurement between the first and the second device to the Admission Control Node.

In an example, the first device 610 further comprises the timing unit 617 adapted for, when the decision is allowing the first the first device to perform the measurement, starting 340 a second timer having a length corresponding to a waiting time comprised in the received decision, wherein the transmitting unit 616 is adapted for, when the second timer expires, performing the measurement between the first and the second device.

In FIG. 5, the Admission Control Node 500 is also illustrated comprising a receiving unit 501 and a transmitting unit 502. Through these two units, the Admission Control Node 500 is adapted to communicate with other nodes, devices and/or entities in the communication network. The receiving unit 501 may comprise more than one receiving arrangement. For example, the receiving unit may be connected to either or both a wire and an antenna, by means of which the Admission Control Node 500 is enabled to communicate with other nodes, devices and/or entities in the communication network. Similarly, the transmitting unit 502 may comprise more than one transmitting arrangement, which in turn are connected to either or both a wire and an antenna, by means of which the Admission Control Node 500 is enabled to communicate with other nodes, devices and/or entities in the communication network. Admission Control Node 500 further comprises a memory 503 for storing data. Further, the Admission Control Node 500 is illustrated comprising a control or processing unit 509 which in turns is connected to the different units 504-508. It shall be pointed out that this is merely an illustrative example and the Admission Control Node 500 may comprise more, less or other units or modules which execute the functions of the Admission Control Node 500 in the same manner as the units illustrated in FIG. 5.

It should be noted that FIG. 5 merely illustrates various functional units in the Admission Control Node 500 in a logical sense. The functions in practice may be implemented using any suitable software and hardware means/circuits etc. Thus, the embodiments are generally not limited to the shown structures of the Admission Control Node 500 and the functional units. Hence, the previously described exemplary embodiments may be realised in many ways. For example, one embodiment includes a computer-readable medium having instructions stored thereon that are executable by the control or processing unit 509 for executing the method steps performed by the Admission Control Node 500. The instructions executable by the computing system and stored on the computer-readable medium perform the method steps of the Admission Control Node 500 as set forth in the claims.

In FIG. 6, the first device 610 is also illustrated comprising a receiving unit 611 and a transmitting unit 612. Through these two units, the first device 610 is adapted to communicate with other nodes, devices and/or entities in the communication network. The receiving unit 611 may comprise more than one receiving arrangement. For example, the receiving unit may be connected to either or both a wire and an antenna, by means of which the first device 610 is enabled to communicate with other nodes, devices and/or entities in the communication network. Similarly, the transmitting unit 612 may comprise more than one transmitting arrangement, which in turn are connected to either or both a wire and an antenna, by means of which the first device 610 is enabled to communicate with other nodes, devices and/or entities in the communication network. The first device 610 further comprises a memory 613 for storing data. Further, the first device 610 is illustrated comprising a control or processing unit 619 which in turns is connected to the different units 614-618. It shall be pointed out that this is merely an illustrative example and the first device 610 may comprise more, less or other units or modules which execute the functions of the first device 610 in the same manner as the units illustrated in FIG. 6.

It should be noted that FIG. 6 merely illustrates various functional units in the first device 610 in a logical sense. The functions in practice may be implemented using any suitable software and hardware means/circuits etc. Thus, the embodiments are generally not limited to the shown structures of the first device 610 and the functional units. Hence, the previously described exemplary embodiments may be realised in many ways. For example, one embodiment includes a computer-readable medium having instructions stored thereon that are executable by the control or processing unit 619 for executing the method steps performed by the first device 610. The instructions executable by the computing system and stored on the computer-readable medium perform the method steps of the first device 610 as set forth in the claims.

Figure 7:
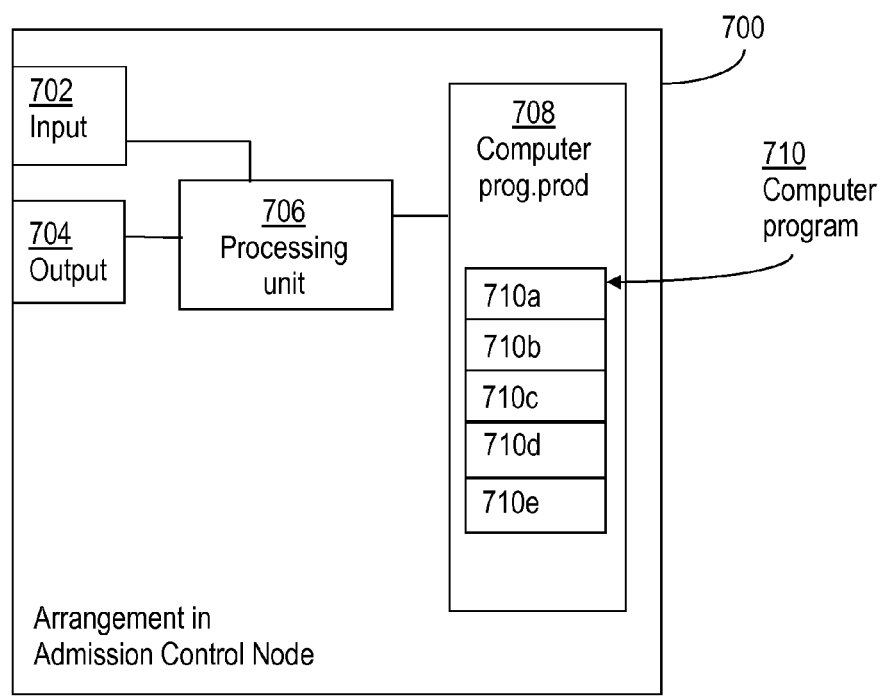
FIG. 7 is a block diagram of an arrangement in an Admission Control Node adapted for enabling a measurement between a first and a second device in a communication network according to an exemplifying embodiment.

FIG. 7 schematically shows an embodiment of an Admission Control Node 700. Comprised in the Admission Control Node 700 are here a processing unit 706, e.g. with a DSP (Digital Signal Processor). The processing unit 706 may be a single unit or a plurality of units to perform different actions of procedures described herein. The Admission Control Node 700 may also comprise an input unit 702 for receiving signals from other entities, and an output unit 704 for providing signal(s) to other entities. The input unit and the output unit may be arranged as an integrated entity or as illustrated in the example of FIG. 5, as one or more interfaces 501/502.

Furthermore, the Admission Control Node 700 comprises at least one computer program product 708 in the form of a non-volatile memory, e.g. an EEPROM (Electrically Erasable Programmable Read-Only Memory), a flash memory and a hard drive. The computer program product 708 comprises a computer program 710, which comprises code means, which when executed in the processing unit 706 in the Admission Control Node 700 causes the Admission Control Node 700 to perform the actions e.g. of the procedure described earlier in conjunction with FIG. 2.

The computer program 710 may be configured as a computer program code structured in computer program modules 710a-710e. Hence, in an exemplifying embodiment, the code means in the computer program of the Admission Control Node 700 comprises a receiving unit, or module, for receiving, from the first device, a request for performing the measurement between the first and the second device. The computer program further comprises a determining unit, or module, for determining segments comprised in a path between the first and the second device, and for determining a current measurement situation for the segments. The computer program further comprises a deciding unit, or module, for deciding to allow or reject the request for performing the measurement based on the current measurement situation for the segments. The computer program also comprises an informing unit, or module, for informing the first device about the decision of allowing or rejecting the request for performing the measurement.

The computer program modules could essentially perform the actions of the flow illustrated in FIG. 2, to emulate the Admission Control Node 500, 700. In other words, when the different computer program modules are executed in the processing unit 706, they may correspond to the units 504-508 of FIG. 5.

Figure 8:
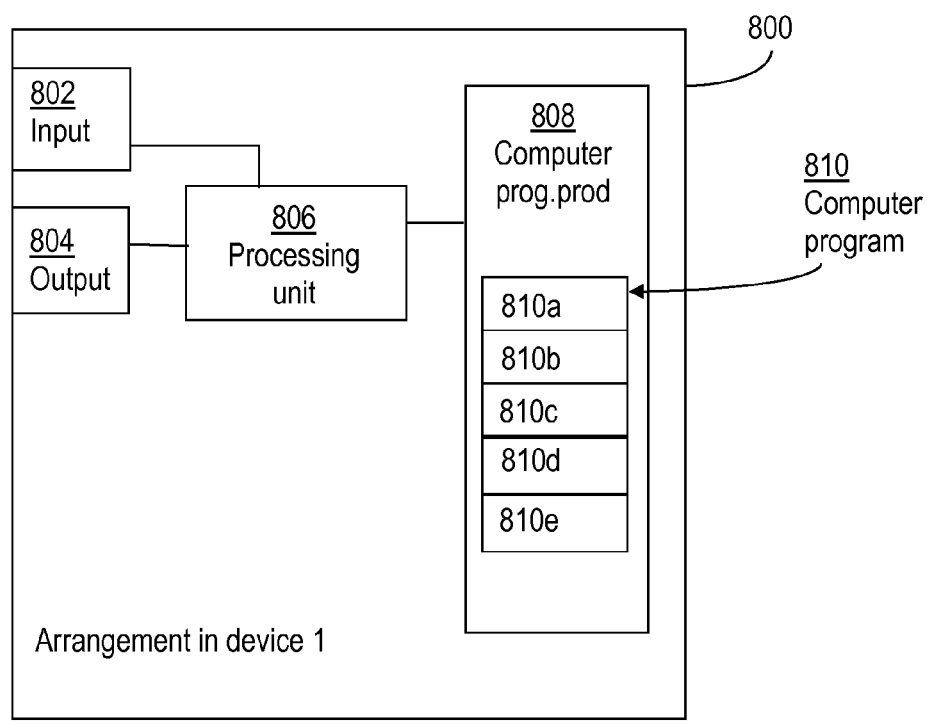
FIG. 8 is a block diagram of an arrangement in a first device adapted for performing a measurement between the first device and a second device in a communication network according to an exemplifying embodiment.

FIG. 8 schematically shows an embodiment of a first device 800. Comprised in the first device 800 are here a processing unit 806, e.g. with a DSP (Digital Signal Processor). The processing unit 806 may be a single unit or a plurality of units to perform different actions of procedures described herein. The first device 800 may also comprise an input unit 802 for receiving signals from other entities, and an output unit 804 for providing signal(s) to other entities. The input unit and the output unit may be arranged as an integrated entity or as illustrated in the example of FIG. 6, as one or more interfaces 611/612.

Furthermore, the first device 800 comprises at least one computer program product 808 in the form of a non-volatile memory, e.g. an EEPROM (Electrically Erasable Programmable Read-Only Memory), a flash memory and a hard drive. The computer program product 808 comprises a computer program 810, which comprises code means, which when executed in the processing unit 806 in the first device 800 causes the first device 800 to perform the actions e.g. of the procedure described earlier in conjunction with FIGS. 3a and 3b.

The computer program 810 may be configured as a computer program code structured in computer program modules 810a-810e. Hence, in an exemplifying embodiment, the code means in the computer program of the first device 800 comprises a sending unit, or module, for sending, to an Admission Control Node, a request for performing the measurement between the first and the second device. The computer program further comprises a receiving unit, or module, for receiving, from the Admission Control Node, a decision with regard to the request. The computer program further comprises a measuring unit, or module, for performing the measuring, when the decision is allowing the first device to perform the measurement.

The computer program modules could essentially perform the actions of the flow illustrated in FIGS. 3a and 3b, to emulate the first device 610, 800. In other words, when the different computer program modules are executed in the processing unit 806, they may correspond to the units 614-618 of FIG. 6.

Although the code means in the respective embodiments disclosed above in conjunction with FIGS. 5 and 6 are implemented as computer program modules which when executed in the respective processing unit causes the Admission Control Node and the first device respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the Admission Control Node and the first device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by an Admission Control Node for enabling a measurement between a first and a second device in a communication network, the method comprising:
   receiving, from the first device, a request for performing the measurement between the first and the second device;
   determining segments comprised in a path between the first and the second device;
   determining a current measurement situation for the segments in the path;
   deciding to allow or reject the request for performing the measurement between the first and the second device based on the current measurement situation for the segments in the path; and
   informing the first device about the decision of allowing or rejecting the request for performing the measurement toward the second device.

2. The method according to claim 1, wherein the request for performing the measurement comprises information of the type of measurement to be performed between the first and the second device, wherein deciding to allow or reject the request for performing the measurement further is based on the type of measurement.

3. The method according to claim 1, wherein deciding to allow or reject the request comprises determining a point in time when the first device is allowed to perform the requested measurement or determining a backoff time that the first device wait before requesting to perform the measurement anew.

4. The method according to claim 1, wherein determining the current measurement situation for the segments comprises, for each segment comprised in the path between the first and the second device, determining the number of and type of any ongoing measurement and the duration of the ongoing measurements by looking in a database having an entry for each segment comprised in the communication network having ongoing measurements being performed.

5. The method according to claim 4, further comprising, for each segment comprised in the path between the first and the second device which are present in the database, determining if the current measurement situation allows for the requested measurement to be performed based on the current measurement situation and the type and duration of the requested measurement.

6. The method according to claim 4, wherein the segments in the database are represented by hash codes, wherein determining existence in the database is performed using a Bloom filter.

7. The method according to claim 5, further comprising, when a segment comprised in the path between the first and the second device is not present in the database, creating and inserting an entry into the database for the segment, the created entry comprising information about the type of and duration of the requested measurement.

8. The method according to claim 7, further comprising, when it is decided to allow the measurement, updating the database so that the number of ongoing current measurements and the type of ongoing measurements for each segment involved in the measurement is updated, and when the measurement is terminated, updating the database so that the number of ongoing current measurements for each segment involved in the measurement is updated.

9. The method according to claim 1, wherein the requested measurement and any ongoing measurements are active measurements incurring increased traffic on the segments in the path between the first and the second device.

10. A method performed by a first device for performing a measurement between the first device and a second device in a communication network, the method comprising:
sending, to an Admission Control Node, a request for performing the measurement between the first and the second device;
receiving, from the Admission Control Node, a decision with regard to the request for performing the measurement between the first and the second device;
wherein,
when the decision is allowing the first device to perform the measurement, the first device performing the measurement toward the second device.

11. The method according to claim 10, further comprising when the decision is rejecting the request:
starting a first timer having a length corresponding to a backoff time comprised in the received decision, and when the first timer expires;
sending, to the Admission Control Node, a new request for performing the measurement between the first and the second device.

12. The method according to claim 10, wherein performing the measurement further comprises:
starting a second timer having a length corresponding to a waiting time comprised in the received decision, and when the second timer expires;
performing the measurement between the first and the second device.

13. An Admission Control Node adapted for enabling a measurement between a first and a second device in a communication network, the Admission Control Node comprising a processor and a memory comprising instructions, which when executed, cause the Admission Control Node to:

receive, from the first device, a request for performing the measurement between the first and the second device;
determine segments comprised in a path between the first and the second device, and for determining a current measurement situation for the segments in the path; and
decide to allow or reject the request for performing the measurement between the first and the second device based on the current measurement situation for the segments, and inform the first device about the decision of allowing or rejecting the request for performing the measurement toward the second device.

14. The Admission Control Node according to claim 13, wherein the request for performing the measurement comprises information of the type of measurement to be performed between the first and the second device, and wherein the instructions, when executed by the processor, further cause the Admission Control Node to decide to allow or reject the request for performing the measurement based on the type of measurement.

15. The Admission Control Node according to claim 13, wherein the instructions, when executed by the processor, further cause the Admission Control Node to decide to allow or reject the request by determining a point in time when the first device is allowed to perform the requested measurement or determining a backoff time that the first device wait before requesting to perform the measurement anew.

16. The Admission Control Node according to claim 13, wherein the instructions, when executed by the processor, further cause the Admission Control Node to determine the current measurement situation for the segments by, for each segment comprised in the path between the first and the second device, determine the number of and type of any ongoing measurement and the duration of the ongoing measurements by looking in a database having an entry for each segment comprised in the communication network having ongoing measurements being performed.

17. The Admission Control Node according to claim 16, wherein the instructions, when executed by the processor, further cause the Admission Control Node to determine, for each segment comprised in the path between the first and the second device which are present in the database, if the current measurement situation allows for the requested measurement to be performed based on the current measurement situation and the type and duration of the requested measurement.

18. The Admission Control Node according to claim 16, wherein the segments in the database are represented by hash codes, wherein determining existence in the database is by using a Bloom filter.

19. The Admission Control Node according to claim 17, wherein instructions, when executed by the processor, further cause the Admission Control Node to, when a segment comprised in the path between the first and the second device is not present in the database, create and insert an entry into the database for the segment, the created entry comprising information about the type of and duration of the requested measurement.

20. The Admission Control Node according to claim 19, wherein instructions, when executed by the processor, further cause the Admission Control Node to, when the deciding unit has decided to allow the measurement, update the database so that the number of ongoing current measurements and the type of ongoing measurements for each segment involved in the measurement is updated, and when the measurement is terminated, update the database so that the number of ongoing current measurements for each segment involved in the measurement is updated.

21. The Admission Control Node according to claim 19, wherein the requested measurement and any ongoing measurements are active measurements incurring increased traffic on the segments in the path between the first and the second device.

22. A first device adapted for performing a measurement between the first device and a second device in a communication network, the first device comprising a processor and a memory comprising instructions, which when executed by the processor, cause the first device to:
send, to an Admission Control Node, a request for performing the measurement between the first and the second device;
receive, from the Admission Control Node, a decision with regard to the request for performing the measurement between the first and the second device; and
when the decision is allowing the first device to perform the measurement, the first device performing the measurement toward the second device.

23. The first device according to claim 22, wherein the instructions, when executed by the processor, further cause the first device to:
when the decision is rejecting the request, start a first timer having a length corresponding to a backoff time comprised in the received decision,
when the first timer expires, sending a new request for performing the measurement between the first and the second device to the Admission Control Node.

24. The first device according to claim 22, wherein the instructions, when executed by the processor, further cause the first device to:
when the decision is allowing the first the first device to perform the measurement, start a second timer having a length corresponding to a waiting time comprised in the received decision, and
when the second timer expires, perform the measurement between the first and the second device.

25. A non-transitory computer-readable medium containing computer readable code means, which when run in a processing unit comprised in an arrangement in an Admission Control Node, causes the Admission Control Node to perform a method for enabling a measurement between a first and a second device in a communication network, the method comprising:
receiving, from the first device, a request for performing the measurement between the first and the second device;
determining segments comprised in a path between the first and the second device;
determining a current measurement situation for the segments in the path;
deciding to allow or reject the request for performing the measurement between the first and the second device based on the current measurement situation for the segments in the path; and
informing the first device about the decision of allowing or rejecting the request for performing the measurement towards the device.

* * * * *